(No Model.)

W. W. HARRISON.
BILLIARD COUNTER.

No. 462,704. Patented Nov. 10, 1891.

Witnesses.
C. E. Van Doren.
O. L. Hawley.

Inventor:
William W. Harrison.
By Paul & Merwin
Attys.

UNITED STATES PATENT OFFICE.

WILLIAM WALLACE HARRISON, OF MINNEAPOLIS, MINNESOTA.

BILLIARD-COUNTER.

SPECIFICATION forming part of Letters Patent No. 462,704, dated November 10, 1891.

Application filed December 27, 1890. Serial No. 375,939. (No model.)

*To all whom it may concern:*

Be it known that I, WILLIAM WALLACE HARRISON, of Minneapolis, in the county of Hennepin and State of Minnesota, have invented certain Improvements in Billiard-Counters, of which the following is a specification.

This invention relates to a device designed to be inserted in a billiard-table and to be used for registering the points of the game.

The invention consists, generally, in the construction and combination hereinafter described, and particularly pointed out in the claim.

Figure 1:
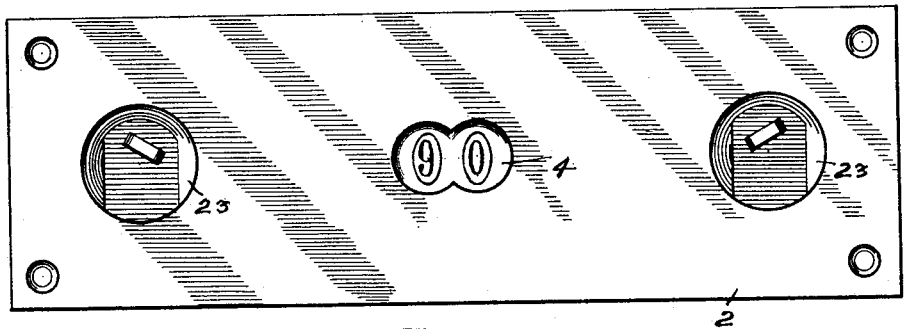
Figure 2:
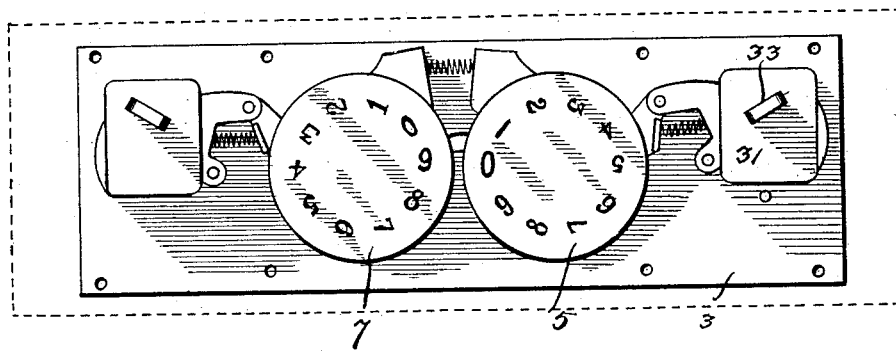
Figure 3:
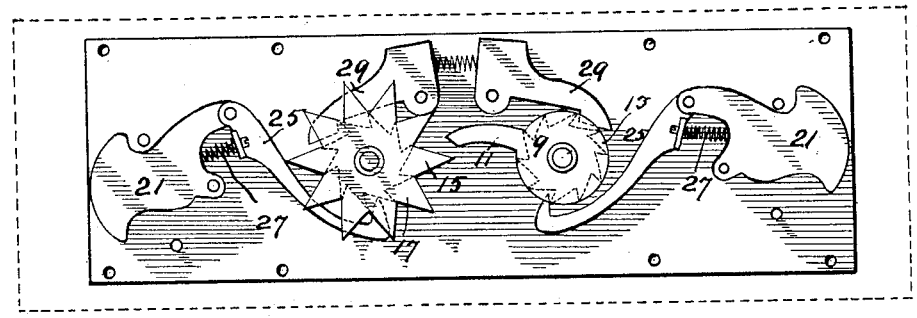

In the accompanying drawings, forming a part of this specification, Figure 1 is a plan view of a device embodying my invention. Fig. 2 is a similar view with the top plate of the casing removed. Fig. 3 is a similar view with the disk-wheels removed.

In the drawings, 2 represents the top plate, to which the mechanism is secured. This plate and the mechanism secured to it are adapted to be inserted in the top of the rail of a billiard-table and to be secured in position by suitable screws passing through openings in the plate. This plate is also provided with an opening 4, through which the registering-wheels can be seen, one figure on each wheel showing through the opening in the plate, and these two figures showing the number of points registered on the device.

Arranged beneath the plate 2, in suitable bearings upon the lower plate 3, are the wheels 5 and 7, each provided with a series of figures arranged upon its surface and running from 1 to 0. The wheel 5 is the units-wheel and the wheel 7 the tens-wheel. Beneath the wheel 5 is a disk 9, provided with a single projection or tooth 11, and secured to the disk 9 is a ratchet 13. The disk 9 and the ratchet are secured so as to turn with the wheel 5. Beneath the wheel 7 is a serrated wheel 15, and beneath the wheel 15 is a ratchet-wheel 17, the wheel 7, the serrated wheel 15, and the ratchet-wheel 17 being secured so as to turn together.

Plates 21 are pivoted beneath openings 23 in the plate 2, and to each of these plates is pivoted a hooked dog 25. These dogs engage the ratchets that are secured to the disk-wheels. Springs 27 are arranged between the plates 21 and the dogs 25, and these springs tend to hold the dogs 25 in engagement with the ratchets. Screws 30 are provided for adjusting the springs 27. Spring-dogs 29 are also arranged in engagement with the ratchets and prevent any back movement thereof. Plates 31 are secured upon the plates 21, extending beneath the holes or openings 23, and upon these plates are the projections 33, adapted to be grasped by the thumb or finger of the operator. By moving the plates 31 the wheels 5 and 7 may be turned. Each time either wheel is turned a new figure on that wheel will be shown at the opening in the plate 2, and at each movement of the wheels a click or sound will be made each time the ratchet is turned one notch, and this sound will be audible to the person operating the device and to other persons engaged in the game, so that it will be known that the right number has been counted. When ten has been counted on the units-wheel, it will operate the tens-wheel and count one thereon; or, instead of operating the units-wheel, if it is desired to count ten or more the tens-wheel may be operated at once and any amount less than ten may be counted on the units-wheel.

The opening over the wheels may be provided with a piece of glass or other transparent material, and the whole device may be finished in nickel or in any other suitable manner to give it a neat and attractive appearance.

I claim as my invention—

The combination, in a billiard-counter, of the plate 2, provided with the middle opening 4 and the openings 23, registering-wheels 5 and 7, having figures adapted to move across the opening 4, said wheels securely supported beneath said plate 2, a serrated wheel 15, arranged beneath the wheel 7, and beneath said wheel 15 a ratchet-wheel 17, all secured together, a disk 9, having the projection 11, adapted to engage wheel 15, pivoted spring-detents forced by a common spring into an engagement with said ratchets 17 and 13, respectively, the pivoted lever-plates 21, having the inwardly-extending arms, the pawl 25, pivoted to the ends of said arms and engaging the under sides of said ratchets, springs 27, arranged between said plates 21 and the pawls 25, finger-lugs provided in connection with the plates 21 and projecting through the openings 23, and stops arranged to limit the movements of said plates 21, substantially as described.

In testimony whereof I have hereunto set my hand this 19th day of December, 1890.

WILLIAM WALLACE HARRISON.

In presence of—
A. M. GASKILL,
C. G. HAWLEY.